United States Patent Office 2,716,930
Patented Sept. 6, 1955

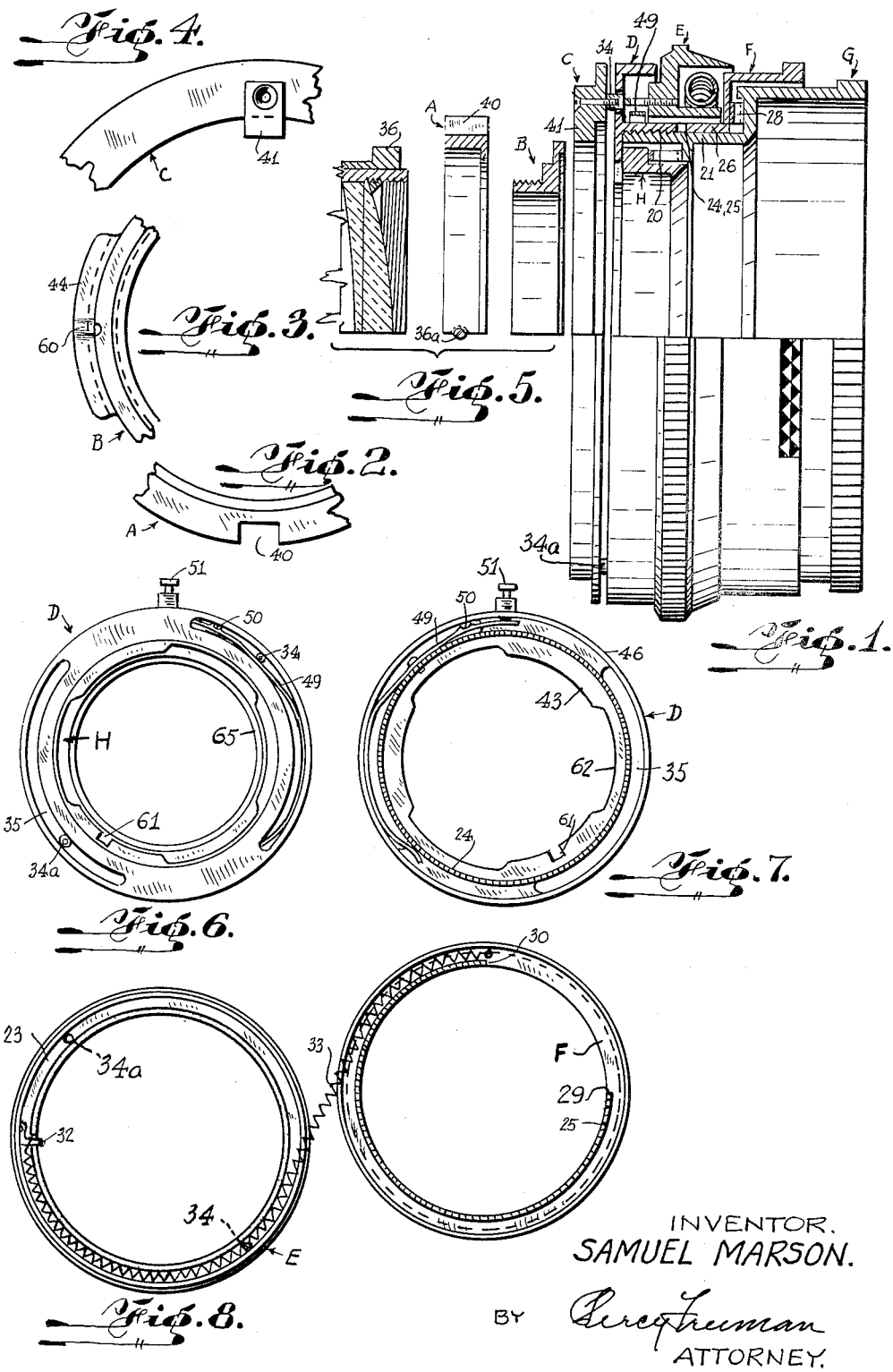

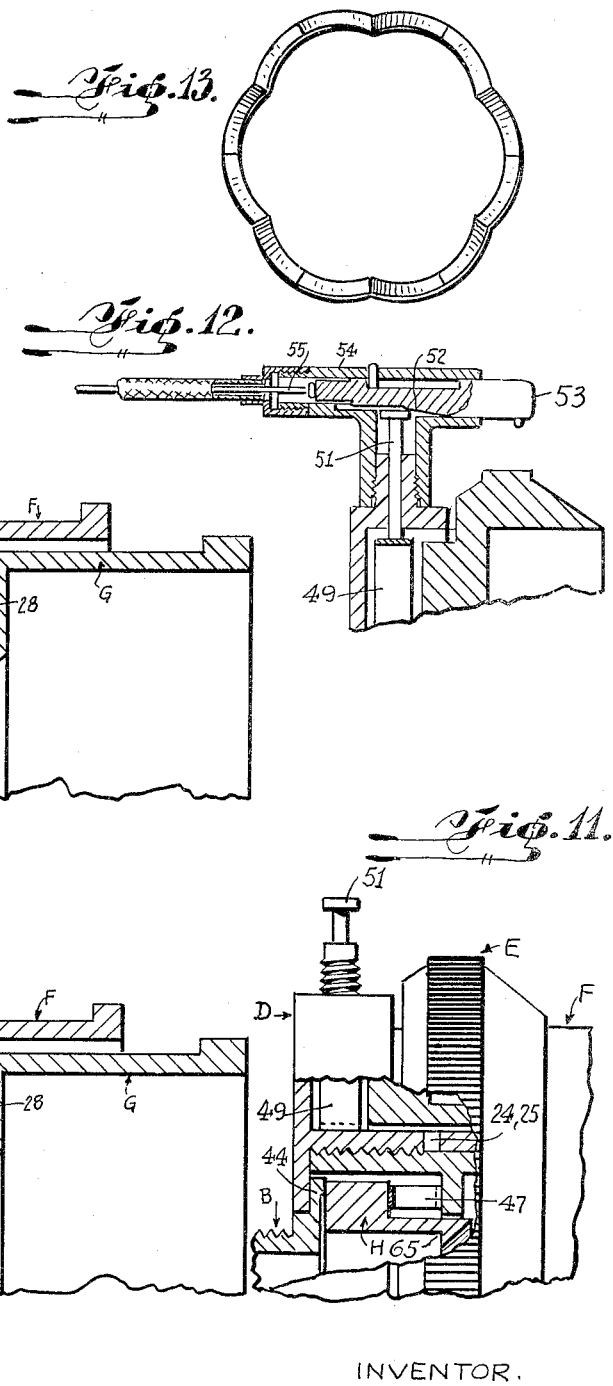

2,716,930
AUTOMATIC LENS DIAPHRAGM CONTROL
Samuel Marson, New York, N. Y.

Application October 27, 1952, Serial No. 317,096

1 Claim. (Cl. 95—64)

This invention relates to new and useful improvements in a device for automatically controlling the diaphragm of a camera lens in shifting it from its widest opening to a pre-set one.

Since in a single reflex camera, focusing is done through the taking lens, and since while focusing the lens, the diaphragm should be kept at its widest opening, regardless of the proper aperture called for by the light conditions then existing, it has hitherto been necessary, after focusing was completed, for the operator to take his eyes off the picture to adjust the diaphragm opening for the desired exposure.

It is the main object of this invention to eliminate this necessity so that in focusing the camera and taking the picture the operator may not have to remove his eyes from the finder in order to re-set the diaphragm to the size of opening best suited for the then existing light condition.

A further object is to provide a simple, efficient device which is composed of a minimum number of simple parts and which can be readily and easily attached to the ordinary reflex type camera.

A still further object is to provide a simple, easily operated device in which the aperture for film exposure may be pre-set to the desired value and then opened wide for focusing after which the aperture is stopped down automatically by merely pressing a trigger which also in proper sequence operates the shutter.

Briefly and in general terms the invention includes means attachable by adaptor rings, to various camera lenses whereby the operation of suitable rings on the device will open and close the diaphragm of the lens. The device is provided with a pre-setting ring which can be adjusted for the proper diaphragm opening, a spring-retracted ring for setting the diaphragm to full opening, means to latch the diaphragm in this open position, means under the control of the operator to release the latching means, and means to stop the ring under spring tension in the pre-set position desired as it moves back towards normal position.

More particularly, the invention includes a series of rings to form a pre-setting device attachable to the front of the lens, and comprising one ring adjusted in a pre-set fashion to a position indicative of the exposure opening of the diaphragm, and having a stop shoulder or similar means thereon. It includes another ring movable under spring tension and connected to the diaphragm ring and having a pin stop element to cooperate with said shoulder to stop the second ring in the pre-set position. It also includes means to latch said ring against said spring tension in the position of full open diaphragm until released by a trigger connected with the shutter operating mechanism.

The present preferred form which the invention may assume is illustrated in the drawings, of which:

Fig. 1 is a general vertical cross section through the device.

Fig. 2 is an enlarged elevation of part of a diaphragm adaptor ring utilized in engaging the device with the diaphragm ring of the camera lens.

Fig. 3 is an enlarged partial elevation of an adaptor ring which is secured to the lens mount of the camera for mounting the device on the lens.

Fig. 4 is an enlarged partial elevation of the engaging ring of the device which interengages with the diaphragm adaptor ring shown in Fig. 2.

Fig. 5 is an exploded fragmentary sectional view of the front of a lens mount and the two adaptor rings shown in Figs. 2 and 3.

Fig. 6 is an elevation of one of the rings comprising the device.

Fig. 7 is an opposite elevation of the same ring.

Fig. 8 is an elevation of two interacting rings showing the driving spring and other related parts.

Fig. 9 is a partial enlarged section showing the ratchet rings in locked relation.

Fig. 10 is a similar view showing the rings in unlocked relation.

Fig. 11 is a fragmentary sectional view showing the device mounted on the adaptor ring shown in Fig. 3.

Fig. 12 is a fragmentary sectional view showing a cable release attachment for simultaneously releasing the latching device and the camera shutter.

Fig. 13 is a perspective view of one of the flat springs employed in holding the ratchet members locked.

Referring now merely to the specific form of the invention shown in the drawings, it will be seen that there are two rings G and D which have sleeve portions 20 and 21 which are screwed together to hold the rings G and D in fixed relation. The inner end of sleeve 20 is provided with clutch teeth 24 to cooperate with clutch teeth 25 on a sleeve portion 26 of ring F. A corrugated washer-type spring 28 is disposed between parallel shoulders on rings G and F, and tends to hold the teeth sets together in clutched relation. The sleeve 26 of ring F is otherwise rotatable on the sleeve portion 21 when it is pulled away from the sleeve portion 20 to disengage the teeth 24 and 25.

As shown in Fig. 8, the teeth 25 are cut away along a predetermined arc corresponding to the amount of arc required to move the diaphragm over its full range. This cut-away portion thus forms shoulders 29 and 30. Cooperating with ring F is a ring E turnable on the sleeves 20 and 26, and provided with a stop pin 32. Pin 32 travels in the arcuate cut-away portion between shoulders 29 and 30 on ring F. A coil spring 33 is fastened at one end to the ring F and at the other end to the pin 32 on ring E, the spring being housed in annular groove 23 in ring E. It will be observed that when rings E and F are in assembled relation, as seen in Figs. 9 and 10, the web portion 22 of ring F serves to enclose the spring 33 and that when pin 32 is against shoulder or abutment 29, the spring 33 is under sufficient tension to yieldingly retain the pin 32 against abutment 29.

On the face of ring E opposite groove 23 are a pair of projecting pins 34 and 34a which extend through elongate arcuate slots 35 formed in ring D (Figs. 6 and 7). To the other end of these pins is secured ring C so that rings C and E rotate as a unit.

In assembling the device with the camera, diaphragm adaptor ring A is slipped over the diaphragm ring 36 and secured thereto by set-screw 36a. Adaptor ring B is then screwed into the front of the lens mount.

In attaching the diaphragm control device to the lens, lugs 41 on ring C are engaged in keyways 40 of ring A.

The flanged projections 44 on ring B are pushed through openings 62 and are rotated bayonet fashion to be held back of shoulders 43 on ring D by the pressure of a filter ring H which is pressed against it by a corrugated washer type spring 47 extending between respective shoulders of the ring G and the filter ring H (Fig. 11). Embossment 60 on ring B engages notch 61 on ring D to prevent relative rotation.

It will thus be seen that rotation of ring E will rotate the lens diaphragm ring in the same direction and through the same arc.

On ring D flange portion 46 and sleeve portion 20 form a channel into which there is disposed a latch spring 49 intermediately pinned to the floor of the channel and having one end with a latch groove 50 therein (Fig. 7). Pin 34 is adapted to be received in this latch groove when the ring E is moved or turned to bring the pin to the extreme upper end of the slot 35 in the ring D. In this upper position, the parts are so arranged that the diaphragm of the camera is fully opened for focusing. As clearly shown in Fig. 7, the outer end of this latch spring 49 is engaged by the lower end of a release stem 51 slidably mounted in the wall 46 of the ring D.

It will be noted that ring E, when released by depression of stem 51, travels from the latched position of pin 34, i. e. from the full open position of the diaphragm, until stop 32 on ring E strikes shoulder or abutment 29. The arc through which stop 32 is allowed to travel depends upon the angular position of ring F relative to ring D.

The length of arc of travel of ring E is governed by the position of abutment 29 on ring F relative to stop 32.

By pulling ring F back against spring pressure 28, teeth 24—25 are disengaged as seen in Fig. 10, permitting rotation of ring F to vary the degree of arc between the latch point and abutment 29 within 1° of arc, there being one tooth for each degree of arc.

Since stop 32 is normally resting against abutment 29, and under tension of spring 33, rotation of ring F in either direction will rotate with it ring E, and since as previously stated rotation of ring E is communicated to lens diaphragm ring 36, it will be seen that when diaphragm ring 36 has reached the desired marking on the periphery of the lens mount against the index line, indicating the degree of diaphragm opening, and ring F is permitted to spring back to re-engage teeth 24—25, the desired position has been pre-set for the desired diaphragm opening. If now ring E is rotated relative to ring F against tension of spring 33 until pin 34 engages the latch groove 50, the diaphragm 36 will be rotated to full open position and will so remain until stem 51 is depressed, thus releasing ring E to return under tension of spring 33 till stop 32 hits abutment 29. Obviously, the diaphragm will also close down from the full open position to the opening previously set.

As shown in Fig. 12, the upper end of the stem 51 is adapted to be engaged and moved down by the tapered side 52 of a slidable trigger 53 disposed in a suitable sleeve 54 housing the stem 51. The outer end of this trigger is adapted to push the shutter releasing wire 55 but the relation of the parts is such that the stem 51 is depressed to release the pin 34 before the shutter is released to take the picture. The instant the pin is released, the ring E is snapped back by spring 33 until the stop 32 abuts the shoulder 29 formed by the cut-away teeth 25 and stops so that the diaphragm is then closed down the desired amount predetermined by the setting of the ring F in the manner above described.

As best seen in Fig. 11, ring H has two functions. It communicates pressure of spring 47 to the lips 43—44 of the bayonet lock and also by reason of its shouldered annulus 65 it will serve to hold a filter.

A brief resume of the operation of the device indicates that it can be easily attached to and supported on the front of the lens mount and connected to the diaphragm ring. When so attached and a picture is to be taken, the operator, using his own judgment or a reading on his light meter, calculates and determines his diaphragm opening. He then moves the pre-setting ring F, after disengaging the clutch, until the proper graduation comes opposite the index point on the lens after which he permits the ring F to re-lock its teeth with those on stationary ring D. This adjustment thus disposes the abutment 29 in different-from-normal relation. He then actuates the ring E until pin 34 latches with the spring 49 above described, thus assuring that the diaphragm is fully opened for best focusing conditions. After he has focused his lens then he is ready to take his picture and to do this he merely pushes on the trigger 53 which causes the stem 51 to be depressed to release the pin 34, whereupon the spring 33 retracts the ring E back until the stop 32 thereupon strikes the shoulder 29 in the pre-setting ring F. This return of the ring E to pre-set position effects the positioning of the camera diaphragm to the proper desired aperture opening for the exposure of the film in accordance with the pre-setting. Therefore, the instant the picture is focused, the operator can immediately take the picture without his attention or his hands being required for any other operation than that of pressing the trigger 53.

While the invention has been described in detail and shown with respect to the accompanying drawings, it is not to be limited to such details and forms, since many changes and modifications may be made in the invention without departing from the spirit and scope of the invention in its broadest aspects. Hence, it is desired to cover any and all forms and modifications of the invention which may come within the language and scope of the appended claim.

Having thus described my invention, what I claim as new and desire to secure by Letters Patent, is:

A detachable lens-diaphragm control device for use selectively with all complete conventional lens mounts of single lens reflex cameras, which comprises a ring fixedly positioned relative to a lens mount, a diaphragm-actuating ring operatively connected to the diaphragm ring of a camera lens, an adjustable pre-setting ring having an abutment and settable to stop said auxiliary ring at desired rotative position relative to the fixed ring, an extensible power spring connecting said actuating ring and presetting ring to rotate together as a unit while presetting, said auxiliary ring being movable to open the diaphragm wide and place the power spring under tension, a stop on said last-mentioned ring cooperating with said abutment, said fixed ring having slots arcuate in form, pins on said actuating ring and extending through said slots, a plate connected to said pins and rotatable therewith, means on said plate to connect the diaphragm ring of the camera lens thereto, clutch teeth on said fixed ring, cooperating clutch teeth on said adjustable ring, said last ring slidable axially to engage and disengage said clutch, spring means engaging said adjustable ring to hold the clutch teeth engaged, a latch spring on said fixed ring and cooperating with one of said pins to latch it at one end of its slot whereby the actuating ring holds the diaphragm wide open for focusing, and means operated by the shutter releasing means to release the latch and allow the power spring to retract the actuating ring back to bring its stop element into engagement with the abutment on the adjustable ring to stop the diaphragm down to the pre-set value, in advance of the operation of the shutter.

References Cited in the file of this patent

UNITED STATES PATENTS

| 907,486 | Felt | Dec. 22, 1908 |
| 2,269,401 | Steiner | Jan. 6, 1942 |
| 2,311,822 | Frankel | Feb. 23, 1943 |
| 2,371,524 | Kals | Mar. 13, 1945 |
| 2,612,093 | Schutz | Sept. 30, 1952 |

FOREIGN PATENTS

| 108,458 | Great Britain | Jan. 17, 1918 |
| 409,777 | Great Britain | May 10, 1934 |